US012756950B2

(12) United States Patent
Nishiguchi

(10) Patent No.: US 12,756,950 B2
(45) Date of Patent: Oct. 6, 2026

(54) SHOOTING CONTROL APPARATUS, IMAGE CAPTURING APPARATUS, SHOOTING CONTROL METHOD, AND STORAGE MEDIUM

(71) Applicant: CANON KABUSHIKI KAISHA, Tokyo (JP)

(72) Inventor: Tatsuya Nishiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 18/751,621

(22) Filed: Jun. 24, 2024

(65) Prior Publication Data

US 2025/0024169 A1 Jan. 16, 2025

(30) Foreign Application Priority Data

Jul. 13, 2023 (JP) ................................ 2023-115464

(51) Int. Cl.
*H04N 25/587* (2023.01)
*H04N 25/60* (2023.01)

(52) U.S. Cl.
CPC ........... *H04N 25/587* (2023.01); *H04N 25/60* (2023.01)

(58) Field of Classification Search
CPC ............................. H04N 25/587; H04N 25/60
See application file for complete search history.

(56) References Cited

U.S. PATENT DOCUMENTS 11,184,565 B2 11/2021 Kobuse
12,058,449 B2 * 8/2024 Sasaki .................... H04N 23/76
12,513,409 B2 * 12/2025 Sasaki .................... H04N 5/265
2013/0120615 A1 * 5/2013 Hirooka ............... H04N 23/743 348/E5.051
2014/0267815 A1 * 9/2014 Koizumi .............. H04N 23/745 348/226.1
2018/0152662 A1 * 5/2018 Takahashi ............ H04N 9/8042
2019/0238804 A1 * 8/2019 Sekine ................. H04N 23/841
2020/0322530 A1 * 10/2020 Choi ..................... G06V 10/803
2020/0336683 A1 10/2020 Kobuse
2023/0092741 A1 * 3/2023 Sasaki .................. H04N 23/745 348/226.1
2023/0131477 A1 * 4/2023 Sato ..................... G06V 40/103 345/629
2024/0155251 A1 * 5/2024 Sasaki .................... H04N 5/265
2025/0342566 A1 * 11/2025 Fukuda ..................... G06T 5/92

FOREIGN PATENT DOCUMENTS

JP 2020-178186 A 10/2020
JP 2024055489 A * 4/2024

* cited by examiner

*Primary Examiner* — Antoinette T Spinks
(74) *Attorney, Agent, or Firm* — Venable LLP

(57) ABSTRACT

A shooting control apparatus including (1) a shooting control unit that controls at least two shots to be taken in response to a shooting instruction, using an image sensor configured to generate, in a single shot, a first image and a second image having different exposures and (2) an exposure control unit that performs first exposure control or second exposure control alternately from shot to shot in each of the at least two shots. The first exposure control is exposure control in which the first image is generated at a first exposure and the second image is generated at a second exposure lower than the first exposure. The second exposure control is exposure control in which the first image is generated at the first exposure and the second image is generated at a third exposure higher than the first exposure.

16 Claims, 9 Drawing Sheets

SHOOTING CONTROL APPARATUS, IMAGE CAPTURING APPARATUS, SHOOTING CONTROL METHOD, AND STORAGE MEDIUM

BACKGROUND OF THE INVENTION

Field of the Invention

The present invention relates to a shooting control apparatus, an image capturing apparatus, a shooting control method, and a storage medium.

Description of the Related Art

An image sensor is known in which two input memories are provided in a column amp unit, and two images having different gains can be output when a single shot is taken (see Japanese Patent Laid-Open No. 2020-178186). Such an image sensor will be referred to as a Dual Gain Output (DGO) image sensor in the present specification. Since the gain of an image sensor is related to ISO sensitivity, a DGO image sensor can be used to generate two images having different exposure levels by generating two images having different gains. Japanese Patent Laid-Open No. 2020-178186 discloses a technique for generating a High Dynamic Range (HDR) composite image by compositing two images generated from a single shot using a DGO image sensor.

Generally speaking, the tone characteristics of an HDR composite image can be improved by using a greater number of images having different exposures. However, Japanese Patent Laid-Open No. 2020-178186 does not mention increasing the number of images used to generate an HDR composite image.

SUMMARY OF THE INVENTION

Having been achieved in light of such circumstances, the present invention provides a technique which uses a DGO image sensor to generate at least three images having different exposures, which can then be used to generate an HDR composite image.

According to a first aspect of the present invention, there is provided a shooting control apparatus comprising: a shooting control unit configured to control at least two shots to be taken in response to a shooting instruction, using an image sensor configured to generate, in a single shot, a first image and a second image having different exposures; and an exposure control unit configured to perform first exposure control or second exposure control alternately from shot to shot in each of the at least two shots, wherein the first exposure control is exposure control in which the first image is generated at a first exposure and the second image is generated at a second exposure lower than the first exposure, and the second exposure control is exposure control in which the first image is generated at the first exposure and the second image is generated at a third exposure higher than the first exposure.

According to a second aspect of the present invention, there is provided an image capturing apparatus comprising: the shooting control apparatus according to the first aspect; and the image sensor.

According to a third aspect of the present invention, there is provided a shooting control method executed by a shooting control apparatus, comprising: controlling at least two shots to be taken in response to a shooting instruction, using an image sensor configured to generate, in a single shot, a first image and a second image having different exposures; and performing first exposure control or second exposure control alternately from shot to shot in each of the at least two shots, wherein the first exposure control is exposure control in which the first image is generated at a first exposure and the second image is generated at a second exposure lower than the first exposure, and the second exposure control is exposure control in which the first image is generated at the first exposure and the second image is generated at a third exposure higher than the first exposure.

According to a fourth aspect of the present invention, there is provided a non-transitory computer-readable storage medium which stores a program for causing a computer to execute a shooting control method comprising: controlling at least two shots to be taken in response to a shooting instruction, using an image sensor configured to generate, in a single shot, a first image and a second image having different exposures; and performing first exposure control or second exposure control alternately from shot to shot in each of the at least two shots, wherein the first exposure control is exposure control in which the first image is generated at a first exposure and the second image is generated at a second exposure lower than the first exposure, and the second exposure control is exposure control in which the first image is generated at the first exposure and the second image is generated at a third exposure higher than the first exposure.

Further features of the present invention will become apparent from the following description of exemplary embodiments with reference to the attached drawings.

DESCRIPTION OF THE EMBODIMENTS

Figure 1:
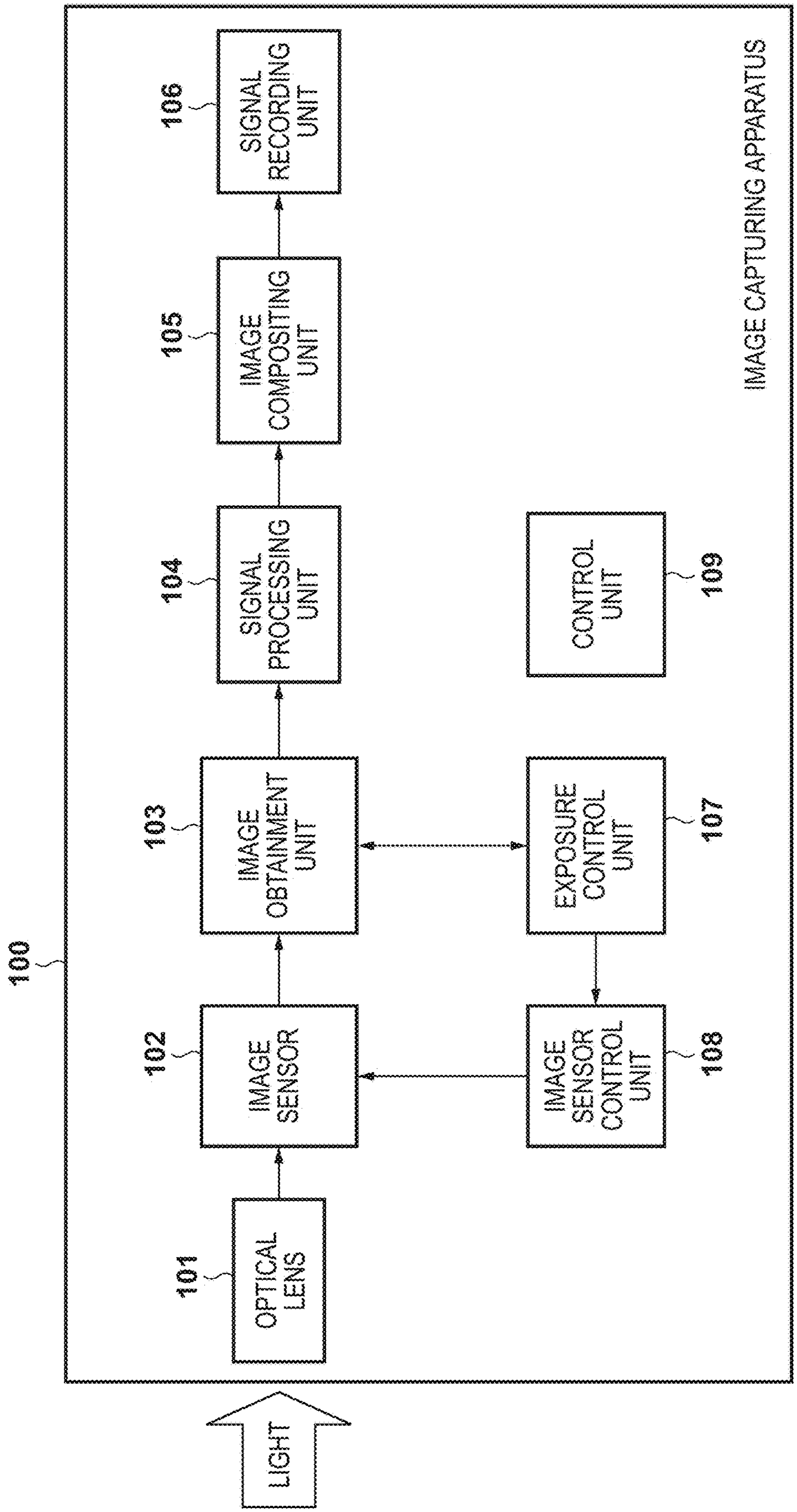
FIG. 1 is a block diagram illustrating the configuration of an image capturing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of an image capturing apparatus 100 capable of functioning as a shooting control apparatus. In FIG. 1, an optical lens 101 is an optical lens for capturing light from a subject and forming the light as an image on an image sensor 102.

The image sensor 102 receives incident light from the optical lens 101, converts that light into an electrical signal, and outputs the electrical signal. A Charge Coupled Device (CCD) image sensor, a Complementary Metal Oxide Semiconductor (CMOS) image sensor, and the like can be given as examples of the image sensor 102. One example of the image sensor 102 is a type of sensor that directly outputs a generated analog video signal. Another example of the image sensor 102 is a type of sensor that performs analog-to-digital (AD) conversion on a generated analog video signal internally and outputs digital data such as low voltage differential signaling (LVDS) data.

Figure 2:
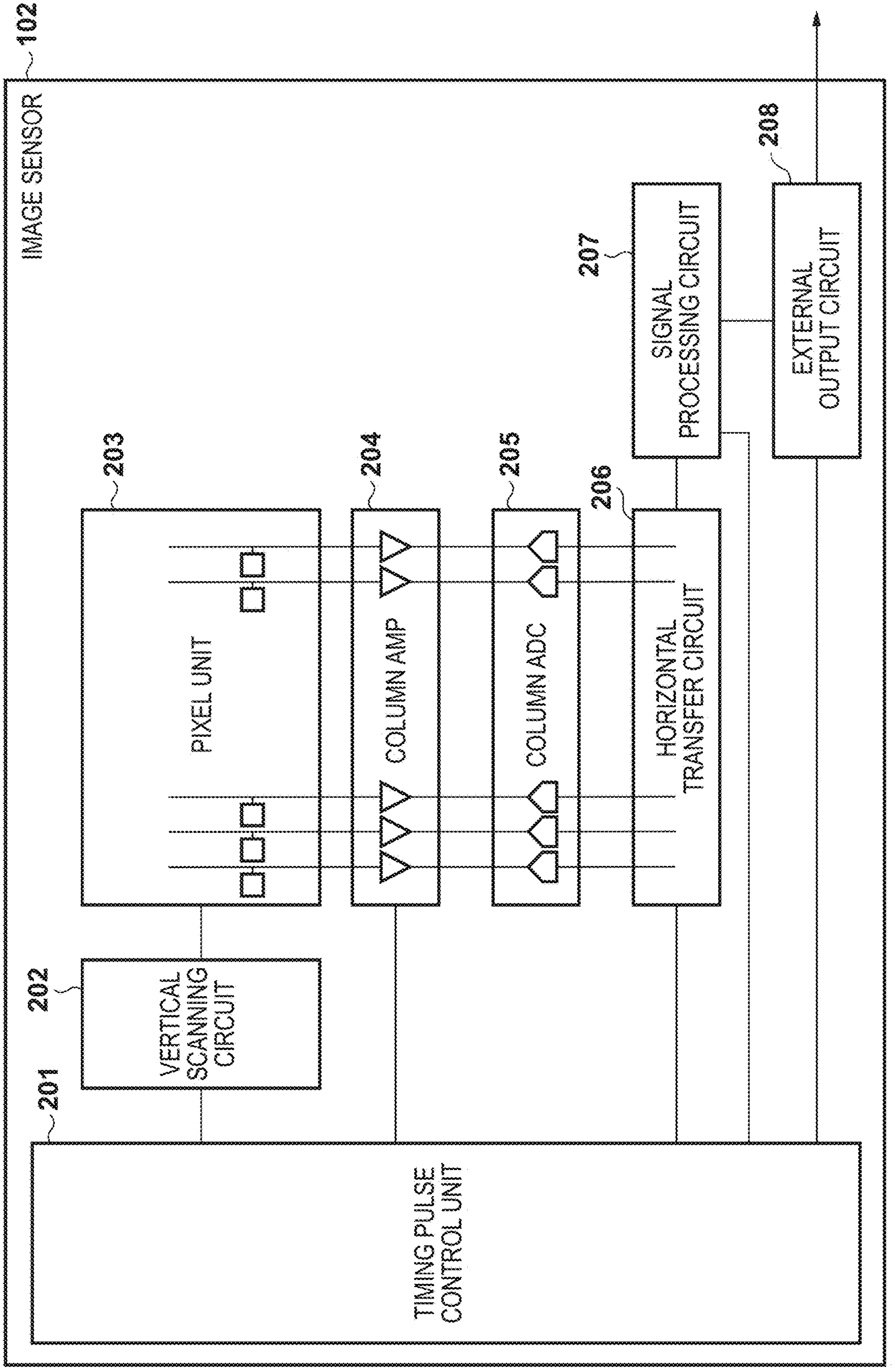
FIG. 2 is a diagram illustrating the configuration of an image sensor 102.

The configuration of the image sensor 102 will be described here with reference to FIG. 2. In the example illustrated in FIG. 2, the image sensor 102 is a type of sensor that outputs digital data. In FIG. 2, a timing pulse control unit 201 controls the operation of the image sensor 102 by supplying an operating clock (CLK) to each block in the image sensor 102, supplying a timing signal to each block, and the like.

A vertical scanning circuit 202 controls the timing for reading out the pixel signal voltages of a pixel unit 203 in which a plurality of pixels are arranged two-dimensionally, in sequence during a single frame. In a single frame, video signals are typically read out on a row-by-row basis, in sequence from the top row to the bottom row.

The pixel unit 203 is a photoelectric conversion device that photoelectrically converts incident light and outputs a voltage corresponding to the incident light intensity. The pixel unit 203 converts the captured light into a charge and accumulates the charge in a capacitive floating diffusion (FD). The capacity of the FD can be changed, and the signal-to-noise ratio (SN ratio) can be improved by changing the capacity according to the ISO sensitivity. Generally, with a low ISO sensitivity, the capacity is set to be “large”, whereas with a high ISO sensitivity, the capacity is set to be “small”. Note that when outputting images having two different gains (described later), the capacity for accumulating the charges is the same for the two gains. Furthermore, the capacities that can be set are not limited to two types, namely “large” and “small,” and a configuration in which the capacity can be set over three or more levels is also possible.

A column amp 204 is used for electrically amplifying the signals read out from the pixel unit 203. Amplifying the signals using the column amp 204 makes it possible to amplify the pixel signal levels with respect to noise arising in a column ADC 205 in a later stage, which substantially improves the SN ratio. The gain of the column amp can also be changed from the timing pulse control unit 201.

The image sensor 102 includes two input memories in the column amp 204, and signals can be output at two types of gains to generate an HDR composite image by changing the gains in the column amp 204. Having two input memories makes it possible to output two types of gains individually for a signal at a specific time read out from the FD. Although doing so increases the amount of data, this also makes it possible to obtain two types of images having different gains with simultaneity. Note that a configuration in which three or more types of images having different gains with simultaneity are output may be used as the configuration of the image sensor 102.

The column ADC 205 performs AD conversion on the readout signals from the column amp 204. The digitized signals are read out sequentially by a horizontal transfer circuit 206. The output of the horizontal transfer circuit 206 is input to a signal processing circuit 207.

The signal processing circuit 207 is a circuit that processes signals digitally. The signal processing circuit 207 can easily perform gain computations by adding an offset value of a set amount to the signals through digital processing, performing shift computations and multiplication, and the like. The pixel unit 203 may also be provided with a pixel region in which light is intentionally shielded. In this case, the signal processing circuit 207 can perform digital black level clamping operations using the light-shielded pixel region. The output of the signal processing circuit 207 is passed to an external output circuit 208.

The external output circuit 208 has a serializer function, and converts multi-bit input parallel signals from the signal processing circuit 207 into a serial signal. The external output circuit 208 converts this serial signal into an LVDS signal or the like, for example, and outputs the signal to the outside of the image sensor 102.

Returning to FIG. 1, an image obtainment unit 103 captures the video signal output by the image sensor 102 and performs various types of processing. If the image sensor 102 is a type that outputs an analog video signal (if AD conversion is not performed within the image sensor 102), the image obtainment unit 103 includes an analog front end that performs AD conversion. The image obtainment unit 103 removes fixed pattern noise produced by the image sensor 102, performs black level clamping processing, and the like. The image obtainment unit 103 also has a role of separating the video signal output by the image sensor 102 into an image signal for recording and an evaluation signal for controlling the image sensor 102.

A signal processing unit 104 performs various types of image processing, including a pixel addition function, noise reduction, gamma correction, knee correction, digital gain, and other types of defect correction, which are typical image processing functions of the image capturing apparatus 100. The image obtainment unit 103 and the signal processing unit 104 also include storage circuitry (not shown) that stores setting values necessary for the correction and image processing performed by each of those units.

An image compositing unit 105 generates an HDR composite image from an HDR generation signal output from the image sensor 102, using any desired compositing method. As one example, there is a compositing method in which a high-gain image is used as a normal image, and a low-gain image is used for parts of the normal image that are bright and blown out. However, the compositing method of the present embodiment is not particularly limited, and any compositing method (compositing algorithm) can be used as long as the compositing is performed using two images having different gains.

A signal recording unit 106 records the video signal received from the image compositing unit 105 into a storage device or storage medium.

An exposure control unit 107 can calculate an optimal exposure amount based on information in the video signal received from the image obtainment unit 103. The exposure control unit 107 then determines operations to be performed by an image sensor control unit 108, and communicates the determined operations to the image sensor control unit 108.

A control unit 109 includes a ROM and a RAM, and controls the image capturing apparatus 100 as a whole by executing control programs stored in the ROM, using the RAM as work memory.

Figure 3:
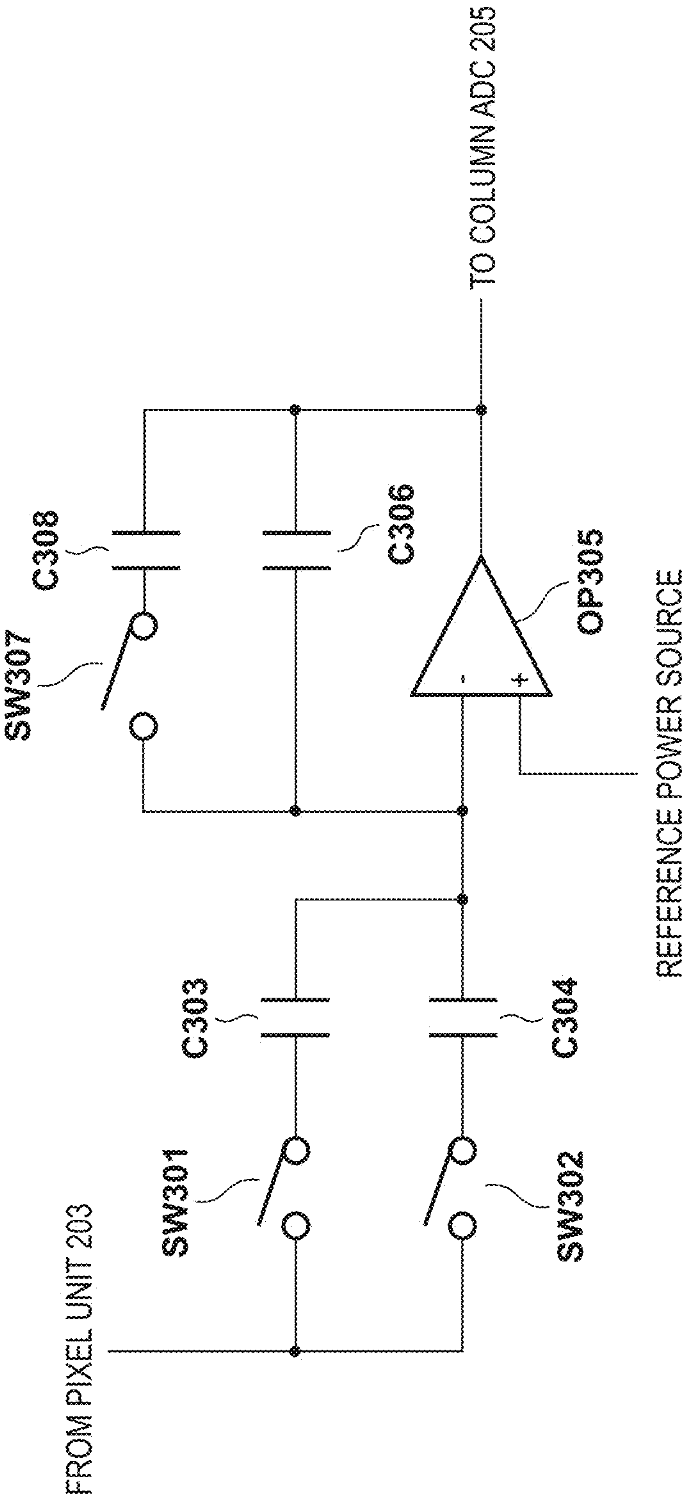
FIG. 3 is a conceptual diagram illustrating a circuit, focusing on one column from a column amp 204.

Operations performed by the image sensor 102 when generating an HDR composite image will be described next with reference to FIG. 3. FIG. 3 is a conceptual diagram illustrating a circuit, focusing on one column from a column amp 204. As described earlier, the image sensor 102 can change the gain in the column amp 204 in order to generate the HDR composite image.

An OP 305 is an op-amp, and input capacitances and feedback capacitances are connected the OP 305. C 303 and C 304 are input capacitances, and SW 301 and SW 302 are switches. A signal read out from the pixel unit 203 is input to the C 303 and the C 304 via the SW 301 and the SW 302.

C 306 and C 308 are feedback capacitances, and SW 307 is a switch. The connection of the C 308 can be controlled by the SW 307. The column amp 204 uses capacitance, and thus the amplification rate is (input capacitance/feedback capacitance).

As described above, the column amp 204 has two input capacitances. First, the column amp 204 applies a gain based on the C 303 and the C 306 to the input signal by turning the SW 301 on and the SW 302 and SW 307 off, and outputs the signal to the column ADC 205. Next, the column amp 204 applies a gain based on the C 304, the C 306, and the C 308 to the input signal by turning the SW 301 off and the SW 302 and SW 307 on, and outputs the signal. This makes it possible to output two images having different gains applied thereto.

Figure 4:
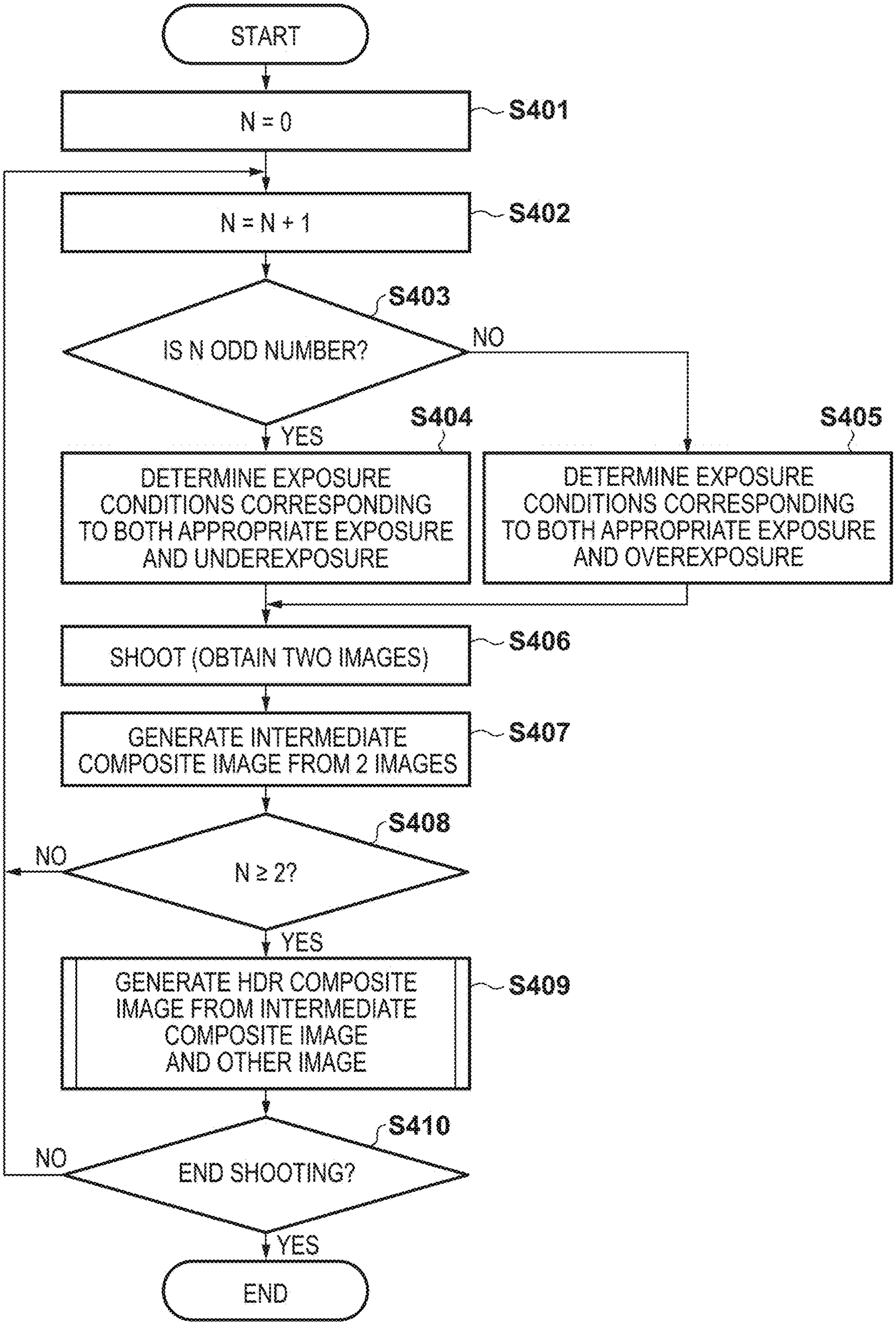
FIG. 4 is a flowchart illustrating HDR shooting processing executed by the image capturing apparatus 100 according to first and second embodiments.

FIG. 4 is a flowchart illustrating HDR shooting processing executed by the image capturing apparatus 100. Unless otherwise noted, the processing of each step in this flowchart is performed under the control of the control unit 109, which operates according to a control program. When a power switch of the image capturing apparatus 100 is turned on, an operation mode is set to an HDR shooting mode, and when a release button of the image capturing apparatus 100 is pressed, the processing of this flowchart begins.

In step S401, the control unit 109 resets N to 0. N is a variable indicating the number of shots taken.

In step S402, the control unit 109 adds 1 to N. If the processing of step S402 is performed for the first time, N is set to 1, indicating that the earliest shot is taken.

In step S403, the control unit 109 determines whether N is an odd number. If N is an odd number (i.e., the number of shots is odd), the sequence moves to step S404, and if not (i.e., the number of shots is even), the sequence moves to step S405.

In step S404, the exposure control unit 107 obtains an appropriate exposure value (EV) through automatic exposure (AE) processing, and determines exposure conditions (ISO sensitivity, aperture, and time value) corresponding to both the appropriate exposure and underexposure.

Figure 6:
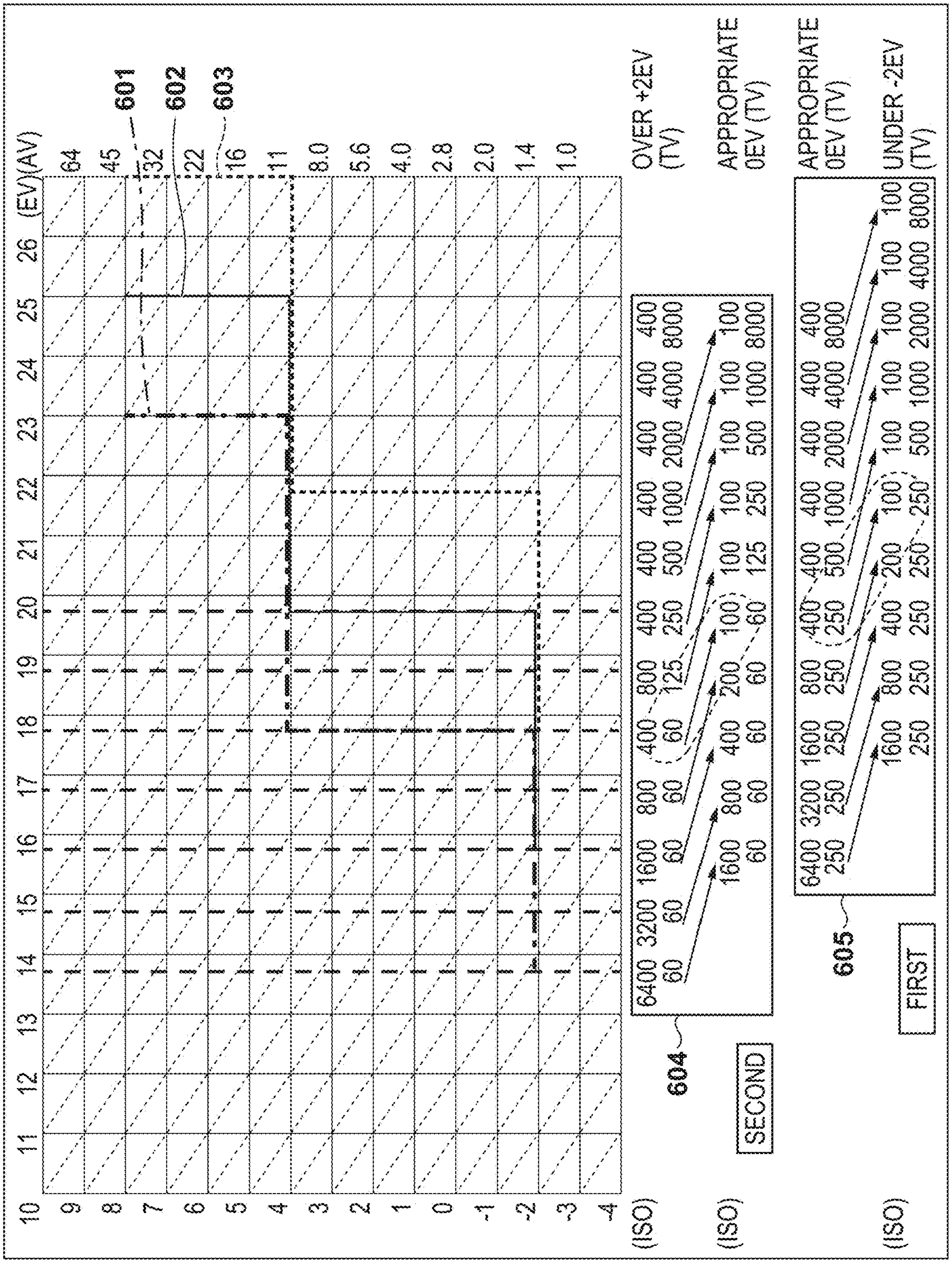
FIG. 6 is a diagram illustrating an example of a program chart used in HDR shooting processing.

FIG. 6 is a diagram illustrating an example of a program chart used in the HDR shooting processing illustrated in FIG. 4. In FIG. 6, the vertical axis on the right represents the aperture value (AV), the left side and the upper part indicate the EV value, and the lower part indicates the time value (TV) and ISO sensitivity value. The exposure control unit 107 determines the appropriate exposure conditions (ISO sensitivity, aperture, and time value) by referring to the program chart based on control values corresponding to the EV value found earlier, and controls the exposure in accordance with those conditions. In FIG. 6, a line 602 represents the appropriate exposure, a line 601 represents overexposure, and a line 603 represents underexposure.

Consider a case where a DGO image sensor, such as the image sensor 102, is used to shoot an image at the appropriate exposure and underexposure at once. When shooting using a DGO image sensor, it is not possible to set different TV values for the appropriate exposure and underexposure, and it is therefore necessary to shoot using a combination of exposure conditions under which underexposure falls within the lowest ISO sensitivity. Accordingly, when, for example, underexposure is shot at −2 EV, the combination indicated in the box 605 is used as the TV value and the ISO value. For example, when the brightness value (BV value) is 10 and the AV value is 2.8, a combination of a TV value of 250 and an ISO value of 400 is used for the appropriate exposure, and a combination of a TV value of 250 and an ISO value of 100 is used for underexposure. Accordingly, in this example, the exposure control unit 107 sets the exposure conditions corresponding to the appropriate exposure to an ISO value of 400, an AV value of 2.8, and a TV value of 250, and sets the exposure conditions corresponding to underexposure to an ISO value of 100, an AV value of 2.8, and a TV value of 250.

In step S405, the exposure control unit 107 obtains an appropriate exposure value (EV) through automatic exposure (AE) processing, through the same method as that used in step S404, and determines exposure conditions (ISO sensitivity, aperture, and time value) corresponding to both the appropriate exposure and overexposure. Note that the image noise increases as the ISO sensitivity in overexposure increases, and it is therefore desirable for the exposure control unit 107 to control the ISO sensitivity for the appropriate exposure determined in step S404 and the ISO sensitivity for overexposure determined in step S405 such that those sensitivities match. Accordingly, when, for example, overexposure is shot at +2 EV, the combination indicated in the box 604 is used as the TV value and the ISO value. For example, when the BV value is 10 and the AV value is 2.8, a combination of a TV value of 60 and an ISO value of 100 is used for the appropriate exposure, and a combination of a TV value of 60 and an ISO value of 400 is used for overexposure. Accordingly, in this example, the exposure control unit 107 sets the exposure conditions corresponding to the appropriate exposure to an ISO value of 100, an AV value of 2.8, and a TV value of 60, and sets the exposure conditions corresponding to overexposure to an ISO value of 400, an AV value of 2.8, and a TV value of 60.

In step S406, the control unit 109 controls the shooting to be performed in accordance with the two types of exposure conditions (ISO value, AV value, and TV value) determined in step S404 or step S405. At this time, the exposure control unit 107 communicates the two types of ISO values under the two types of exposure conditions determined in step S404 or step S405 to the image sensor control unit 108 under the control of the control unit 109. The image sensor control unit 108 sets the two types of gain for the image sensor 102 based on the two types of ISO values communicated here. Because the shooting is performed in accordance with such control, two images having different exposures are generated.

In step S407, the image compositing unit 105 generates an intermediate composite image by compositing the two images obtained in step S406. The two images composited here are two images obtained from a single shot (a single exposure) using the image sensor 102, which is a DGO image sensor. Accordingly, it is not necessary to perform alignment processing for the two images during the compositing processing.

Figure 7A:
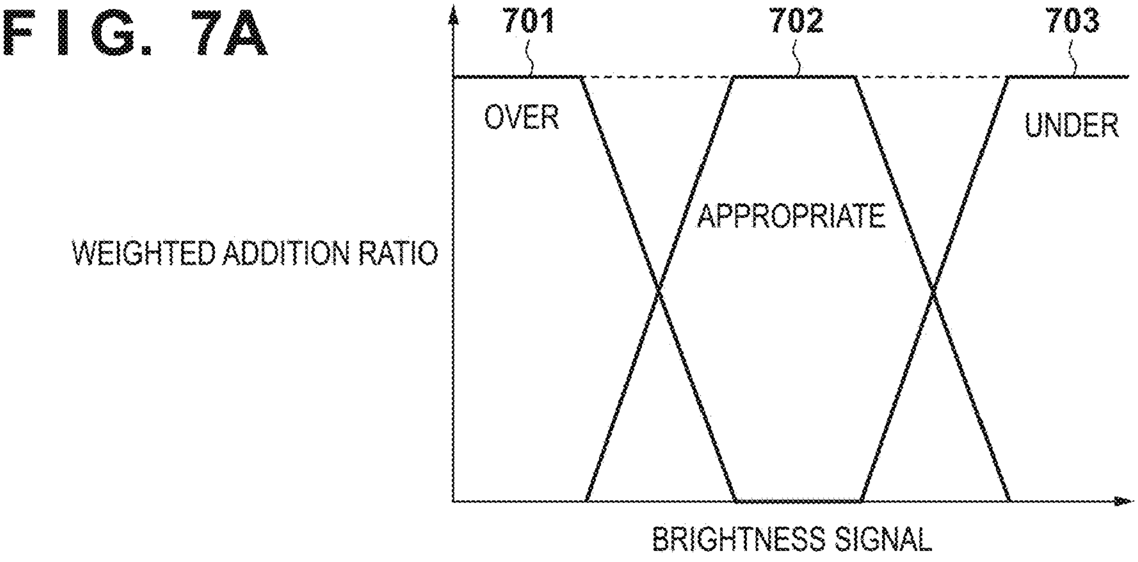
FIGS. 7A to 7C are diagrams illustrating addition ratios for respective images in HDR compositing processing.

Generally, when generating an HDR composite image from the three images at an appropriate exposure, overexposure, and underexposure, respectively, the image compositing is performed using a Mix table that determines addition ratios for the images, such as that illustrated in FIG. 7A. In the Mix table in FIG. 7A, an addition ratio 701 corresponding to overexposure, an addition ratio 702 corresponding to the appropriate exposure, and an addition ratio 703 corresponding to underexposure are set as weighted addition ratios that divide the brightness range roughly into three parts. Based on the Mix table, to obtain an HDR composite image, an overexposed image (hereinafter abbreviated as "over image") may be used for dark regions, an appropriate exposure image (hereinafter abbreviated as "appropriate image") may be used for medium-brightness regions, and an underexposed image (hereinafter abbreviated as "under image") may be used for bright regions. For boundary regions between dark and intermediate parts and between bright and intermediate parts, an effect that smooths the transitions between the images can be obtained by gradually changing the composition ratio according to the weighted addition ratios in the Mix table.

Figure 7B:
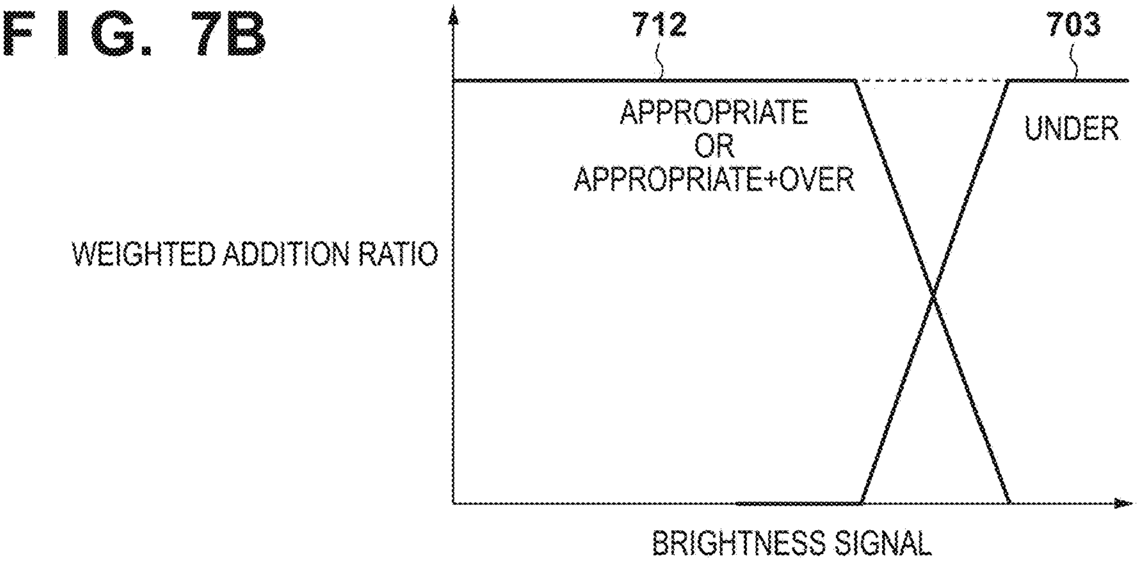
Figure 7C:
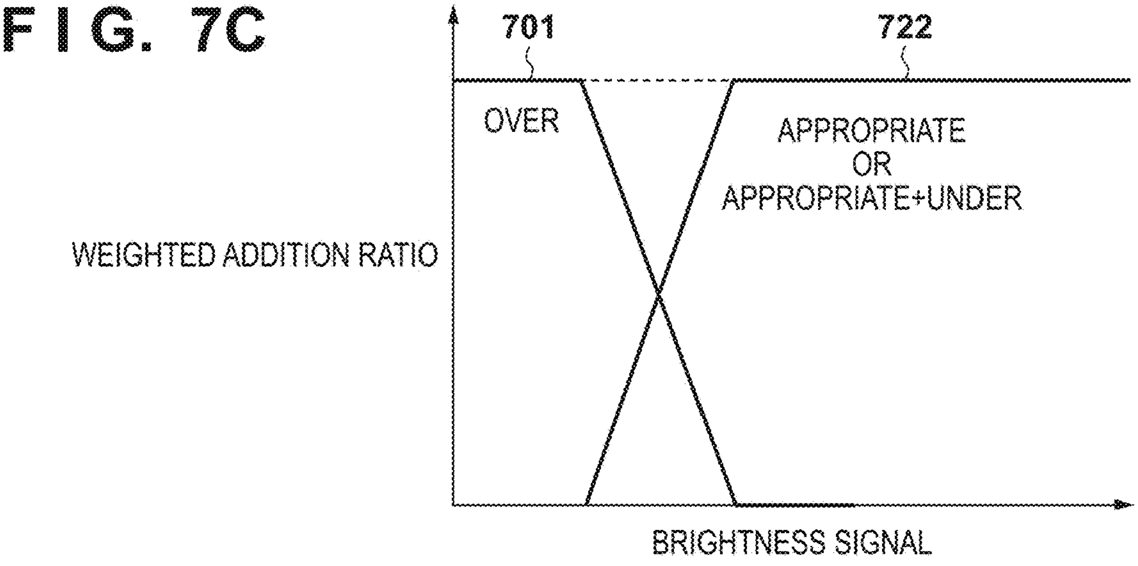

However, in the present embodiment, the compositing processing for the two images obtained through the current shot is performed at the time of step S407. Accordingly, when the two images are an appropriate image and an under image, the image compositing unit 105 performs the compositing processing according to an addition ratio 712 corresponding to the appropriate exposure and the addition ratio 703 corresponding to underexposure, as indicated in FIG. 7B. Likewise, when the two images are an appropriate image and an over image, the image compositing unit 105 performs the compositing processing according to an addition ratio 722 corresponding to the appropriate exposure and the addition ratio 701 corresponding to overexposure, as indicated in FIG. 7C. Note that the addition ratio 712 in FIG. 7B is a composite of the addition ratio 701 and the addition ratio 702 in FIG. 7A, and the addition ratio 722 in FIG. 7C is a composite of the addition ratio 702 and the addition ratio 703 in FIG. 7A.

In step S408, the control unit 109 determines whether N is at least 2. If N is at least 2 (i.e., when an image shot prior to the current shot is present), the sequence moves to step S409, and if not (i.e., when the current shot is the earliest shot), the sequence returns to step S402.

In step S409, processing for generating the HDR composite image from the intermediate composite image and another image is performed. The processing of step S409 will be described in detail later with reference to FIG. 5A.

In step S410, the control unit 109 determines whether to end the shooting. For example, if the release button continues to be pressed, the control unit 109 determines not to end the shooting, whereas if the release button is not being pressed, the control unit 109 determines to end the shooting. If the control unit 109 determines to end the shooting, the processing of this flowchart ends, and if not, the sequence returns to step S402.

The processing of step S409 will be described in detail next with reference to FIG. 5A. In step S501, the control unit 109 determines whether N=2. If N=2 (i.e., for the first instance of the processing of step S409), the sequence moves to step S502, and if not, the sequence moves to step S504.

In step S502, the image compositing unit 105 generates an HDR composite image by compositing the previous intermediate composite image with the current inappropriate image. "Previous intermediate composite image" refers to the intermediate composite image generated in step S407 from the two images obtained from the previous shot (an (N−1)-th shot). "Current inappropriate image" refers to the image, among the two images obtained in the current shot (the N-th shot), that is not the appropriate image, which is an under image when N is an odd number and an over image when Nis an even number. The processing of step S502 is performed when N=2, and thus the current inappropriate image is an over image.

The previous intermediate composite image and the current inappropriate image composited in step S502 have different shooting (exposure) timings. Accordingly, in the compositing, the image compositing unit 105 aligns the previous intermediate composite image with the current inappropriate image. Any publicly-known method can be used as the alignment processing method, such as a method in which a shift amount between two images is detected through frequency analysis. After the alignment processing, the image compositing unit 105 composites the previous intermediate composite image (the image generated by compositing the previous appropriate image with the under image) and the current inappropriate image (the current over image) in accordance with the Mix table in FIG. 7C. An HDR composite image obtained by compositing three images, consisted of the appropriate image, the under image, and the over image, is generated as a result.

In step S503, the signal recording unit 106 saves the HDR composite image generated in step S502 in the recording medium.

In step S504, the image compositing unit 105 generates an HDR composite image by compositing the current intermediate composite image with the previous inappropriate image. "Current intermediate composite image" refers to the intermediate composite image generated in step S407 from the two images obtained from the current shot (the N-th shot). "Previous inappropriate image" refers to the image, among the two images obtained in the previous shot (the (N−1)-th shot), that is not the appropriate image, which is an under image when (N−1) is an odd number and an over image when (N−1) is an even number. The image compositing unit 105 performs the alignment processing in the same manner as in step S502 when performing the compositing processing. When the current intermediate composite image is based on the appropriate image and the over image, the image compositing unit 105 performs the compositing processing in accordance with the Mix table in FIG. 7B. When the current intermediate composite image is based on the appropriate image and the under image, the image compositing unit 105 performs the compositing processing in accordance with the Mix table in FIG. 7C. An HDR composite image obtained by compositing three images, consisted of the appropriate image, the under image, and the over image, is generated as a result.

In step S505, the signal recording unit 106 saves the HDR composite image generated in step S504 in the recording medium.

Figure 5A:
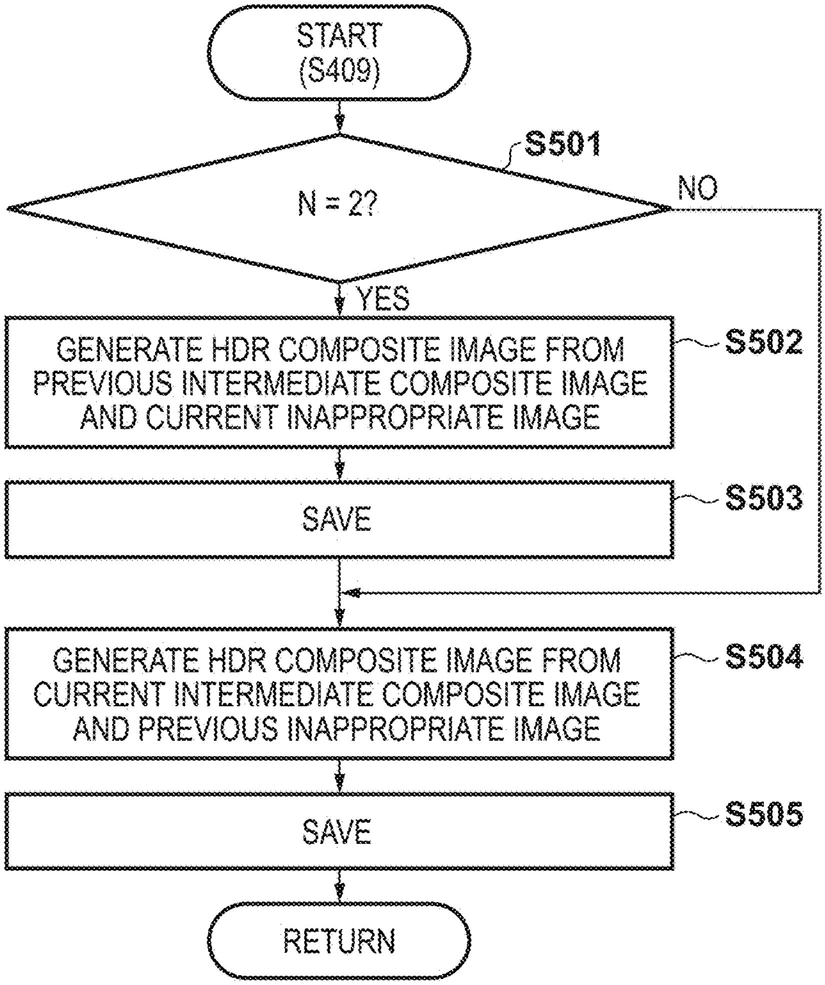
FIG. 5A is a flowchart illustrating, in detail, the processing of step S409 according to the first embodiment.

In this manner, according to FIGS. 4 and 5A, each time a second earliest shot (N=2) and a subsequent shot (N>2) are taken, in step S504, an HDR composite image is generated from the current intermediate composite image, which is generated from the current appropriate image and inappropriate image, and the previous inappropriate image. When the second earliest shot (N=2) is taken, an HDR composite image is also generated from the previous intermediate composite image, which is generated from the previous appropriate image and inappropriate image, and the current inappropriate image. Accordingly, an HDR composite image is generated by combining the following images for each of the shots where N=2 to 5, and the HDR composite image is repeatedly generated in the same manner for each of the shots where N=6 or more (the numbers in parentheses indicate the numbers of the shots).

$N$ = 2:appropriate image(1)+under image(1)+over image(2)

$N$ = 2:appropriate image(2)+over image(2)+under image(1)

$N$ = 3:appropriate image(3)+under image(3)+over image(2)

$N$ = 4:appropriate image(4)+over image(4)+under image(3)

$N$ = 5:appropriate image(5)+under image(5)+over image(4)

As described above, according to the first embodiment, the image capturing apparatus 100 controls at least two shots to be taken using the image sensor 102 in response to a shooting instruction. The image capturing apparatus 100 may control three or more shots to be taken as the at least two shots. The image sensor 102 is a DGO image sensor configured to generate two images (a first image and a second image) having different exposures in a single shot. The image capturing apparatus 100 performs first exposure control (step S404) or second exposure control (step S405) alternately from shot to shot in each of the at least two shots. The first exposure control is exposure control in which the first image is generated at a first exposure and the second image is generated at a second exposure lower than the first exposure. The second exposure control is exposure control in which the first image is generated at the first exposure and the second image is generated at a third exposure higher than the first exposure.

As such, according to the first embodiment, at least three images having different exposures, which can be used to generate an HDR composite image, can be generated using a DGO image sensor.

Note that in the example of FIG. 4, the first exposure is an appropriate exposure, the second exposure is underexposure, and the third exposure is overexposure, and thus an appropriate image, an under image, and an over image that can be used to generate the HDR composite image are obtained. However, in the present embodiment, the three types of exposures corresponding to the three images for generating the HDR composite image are not limited to the appropriate exposure, underexposure, and overexposure. Any exposures can be used as the first exposure, the second exposure, and the third exposure as long as a relationship in which the second exposure is lower than the first exposure and the third exposure is higher than the first exposure is satisfied.

In the example of FIG. 4, exposure control for generating an image at the appropriate exposure (an example of the first exposure) and at underexposure (an example of the second exposure) is performed (first exposure control) when N (the number of the shot) is an odd number. Additionally, exposure control for generating an image at the appropriate exposure (an example of the first exposure) and at overexposure (an example of the third exposure) is performed (second exposure control) when N (the number of the shot) is an even number. Accordingly, the performing of the first exposure control (step S404) and the second exposure control (step S405) alternately from shot to shot starts from the first exposure control. However, a configuration in which the performing of the first exposure control (step S404) and the second exposure control (step S405) alternately from shot to shot starts from the second exposure control may be employed instead. In this case, in FIG. 4, a configuration in which the sequence moves from step S403 to step S405 when Nis an odd number, and from step S403 to step S404 when N is an even number, may be employed.

Additionally, in the example in FIGS. 7A to 7C, two tables are provided for the combinations of the TV value and the ISO value in the program chart, and a configuration is employed in which the ISO sensitivity of the appropriate exposure is different between the combination of the appropriate exposure and underexposure (the first exposure control) and the combination of the appropriate exposure and overexposure (the second exposure control). However, a configuration may be employed in which a single table is used in which the ISO sensitivity for underexposure and overexposure is ±2 EV from the appropriate exposure, rather than changing the ISO sensitivity for the appropriate exposure between the first exposure control and the second exposure control.

Second Embodiment

The first embodiment described the processing of step S409 in detail with reference to FIG. 5A. A second embodiment will describe a variation on the processing of step S409 with reference to FIG. 5B. In the present embodiment, the basic configuration of the image capturing apparatus 100 is the same as in the first embodiment. The following will primarily describe details that are different from the first embodiment.

Figure 5B:
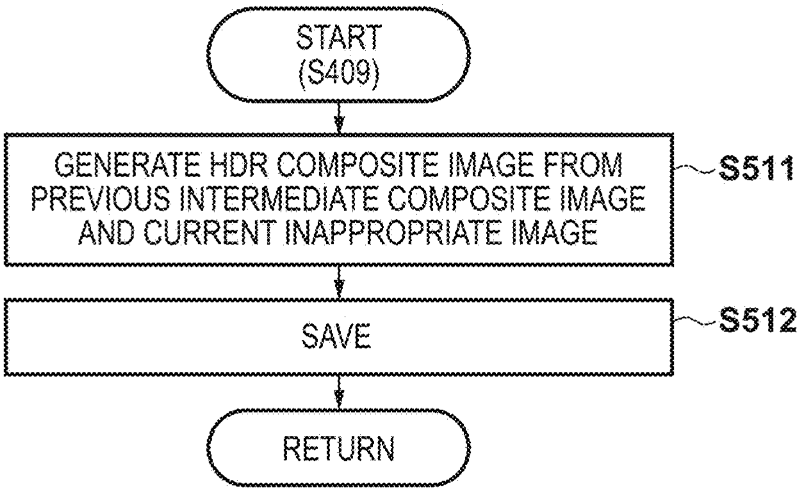
FIG. 5B is a flowchart illustrating, in detail, the processing of step S409 according to the second embodiment.

FIG. 5B is a flowchart illustrating, in detail, the processing of step S409 according to the second embodiment.

In step S511, the image compositing unit 105 generates an HDR composite image by compositing the previous intermediate composite image with the current inappropriate image. The image compositing unit 105 performs the alignment processing in the same manner as in step S502 when performing the compositing processing. When the intermediate composite image one previous is based on the appropriate image and the over image, the image compositing unit 105 performs the compositing processing in accordance with the Mix table in FIG. 7B. When the intermediate composite image one previous is based on the appropriate image and the under image, the image compositing unit 105 performs the compositing processing in accordance with the Mix table in FIG. 7C. An HDR composite image obtained by compositing three images, consisted of the appropriate image, the under image, and the over image, is generated as a result.

In step S512, the signal recording unit 106 saves the HDR composite image generated in step S504 in the recording medium.

In this manner, according to FIGS. 4 and 5B, when a second earliest shot (N=2) and a subsequent shot (N>2) are taken, in step S511, an HDR composite image is generated from the intermediate composite image one previous, which is generated from the appropriate image and inappropriate image one previous, and the current inappropriate image. Accordingly, an HDR composite image is generated by combining the following images for each of the shots where N=2 to 5, and the HDR composite image is repeatedly generated in the same manner for each of the shots where N=6 or more (the numbers in parentheses indicate the numbers of the shots).

$$N=2\text{:appropriate image(1)+under image(1)+over image(2)}$$

$$N=3\text{:appropriate image(2)+over image(2)+under image(2)}$$

$$N=4\text{:appropriate image(3)+under image(3)+over image(4)}$$

$$N=5\text{:appropriate image(4)+over image(4)+under image(5)}$$

According to the second embodiment, the number of HDR composite images generated is one less than the number of shots, but all the HDR composite images are generated from a combination of the appropriate image one previous, the inappropriate image one previous, and the current inappropriate image. As such, when a plurality of HDR composite images generated in succession are used as frames of a moving image, the shooting timings are uniform from frame to frame.

On the other hand, the same number of HDR composite images as the number of shots are generated in the first embodiment, but as can be understood by comparing steps S502 and S504, the first and second HDR composite images are generated at the same timing (the earliest and second earliest shots). As such, when a plurality of HDR composite images generated in succession are used as frames of a moving image, the shooting timings are uniform from frame to frame from the second frame and on, but the timing is shifted with respect to the interval between the first frame and the second frame.

Accordingly, a configuration may be employed in which the processing in FIG. 5A (the first generation processing) or the processing in FIG. 5B (the second generation processing) is used as the processing performed in step S409, according to whether the shooting instruction is a still image shooting instruction or a moving image shooting instruction. By configuring the image capturing apparatus 100 to execute the processing of FIG. 5B in step S409 when a moving image shooting instruction is made, a high-quality moving image which suppresses shifts in the timing can be generated. A large number of frames are generally shot for a moving image, and thus the number of frames being one less than the number of shots taken does not pose a major disadvantage. Additionally, configuring the image capturing apparatus 100 to execute the processing of FIG. 5A in step S409 when a still image shooting instruction is made makes it possible to obtain one more HDR composite image than in the case of FIG. 5B.

Third Embodiment

A third embodiment will describe a configuration in which when generating an HDR composite image, noise is reduced by compositing two appropriate images. In the present embodiment, the basic configuration of the image capturing apparatus 100 is the same as in the first embodiment. The following will primarily describe details that are different from the first embodiment.

Figure 8:
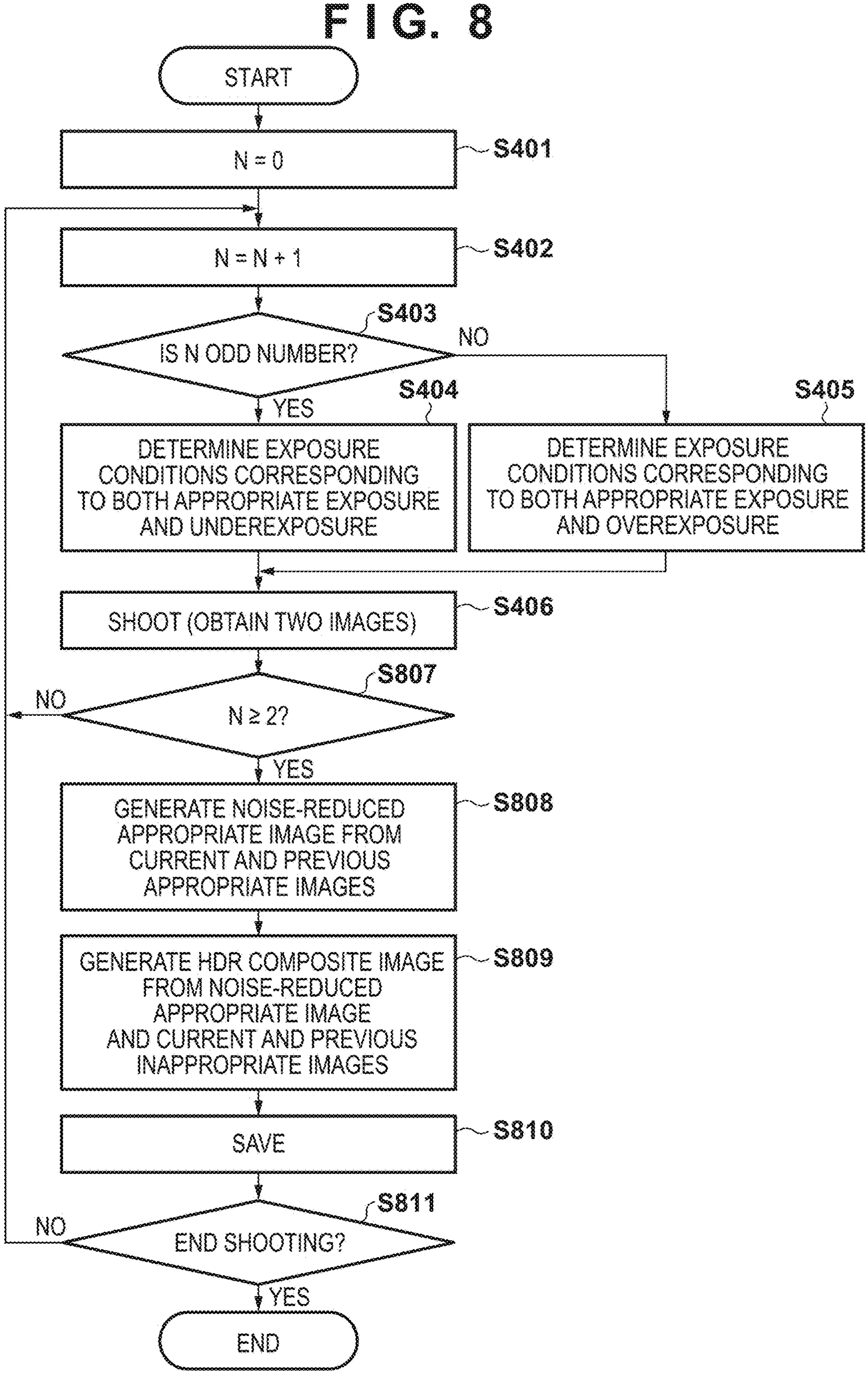
FIG. 8 is a flowchart illustrating HDR shooting processing executed by the image capturing apparatus 100 according to a third embodiment.

FIG. 8 is a flowchart illustrating HDR shooting processing executed by the image capturing apparatus 100 according to the third embodiment. In the first embodiment and the second embodiment, the processing illustrated in FIG. 4 is executed as the HDR shooting processing, but in the third embodiment, the processing illustrated in FIG. 8 is executed as the HDR shooting processing. In FIG. 8, steps that execute processes identical or similar to those in FIG. 4 are given the same reference signs as in FIG. 4.

In step S807, the control unit 109 determines whether N is at least 2. If N is at least 2 (i.e., when an image shot prior to the current shot is present), the sequence moves to step S808, and if not (i.e., when the current shot is the earliest shot), the sequence returns to step S402.

In step S808, the image compositing unit 105 generates an appropriate image in which noise is reduced (a noise-reduced appropriate image) by compositing the appropriate image one previous with the current appropriate image. The two appropriate images composited in step S808 have different shooting (exposure) timings. As such, the image compositing unit 105 performs the alignment processing in the same manner as in step S502 when performing the compositing processing. After the alignment processing, the image compositing unit 105 performs noise reduction processing that composites the appropriate image one previous with the current appropriate image. Any publicly-known method, such as cyclic noise reduction, can be used as the noise reduction processing method.

In step S809, the image compositing unit 105 generates an HDR composite image by compositing the current inappropriate image and the inappropriate image one previous with the noise-reduced appropriate image generated in step S808. The image compositing unit 105 performs the alignment processing in the same manner as in step S502 when performing the compositing processing. The images composited here are the appropriate image (and strictly speaking, the noise-reduced appropriate image), the under image, and the over image, and thus the image compositing unit 105 performs the compositing according to the Mix table in FIG. 7A. An HDR composite image obtained by compositing three images, consisted of the appropriate image (strictly speaking, the noise-reduced appropriate image), the under image, and the over image, is generated as a result.

In step S810, the signal recording unit 106 saves the HDR composite image generated in step S809 in the recording medium.

In step S811, the control unit 109 determines whether to end the shooting. For example, if the release button continues to be pressed, the control unit 109 determines not to end the shooting, whereas if the release button is not being pressed, the control unit 109 determines to end the shooting. If the control unit 109 determines to end the shooting, the processing of this flowchart ends, and if not, the sequence returns to step S402.

As described above, according to the third embodiment, the image capturing apparatus 100 can generate an HDR composite image in which noise of a pixel corresponding to the appropriate exposure is reduced by compositing an appropriate image generated in the current shot, an appropriate image generated in the shot one previous, an inappropriate image generated in the current shot, and an inappropriate image generated in the shot one previous, for each shot excluding the earliest shot among at least two shots.

Fourth Embodiment

Although the first to third embodiments describe a configuration in which the HDR composite image is saved, a configuration in which the pre-compositing appropriate image and inappropriate image are saved in addition to the HDR composite image may be employed. Accordingly, the fourth embodiment will describe a configuration in which the appropriate image and the inappropriate image (the under image or the over image) obtained in a single shot are saved as a single RAW image file.

Figure 9A:
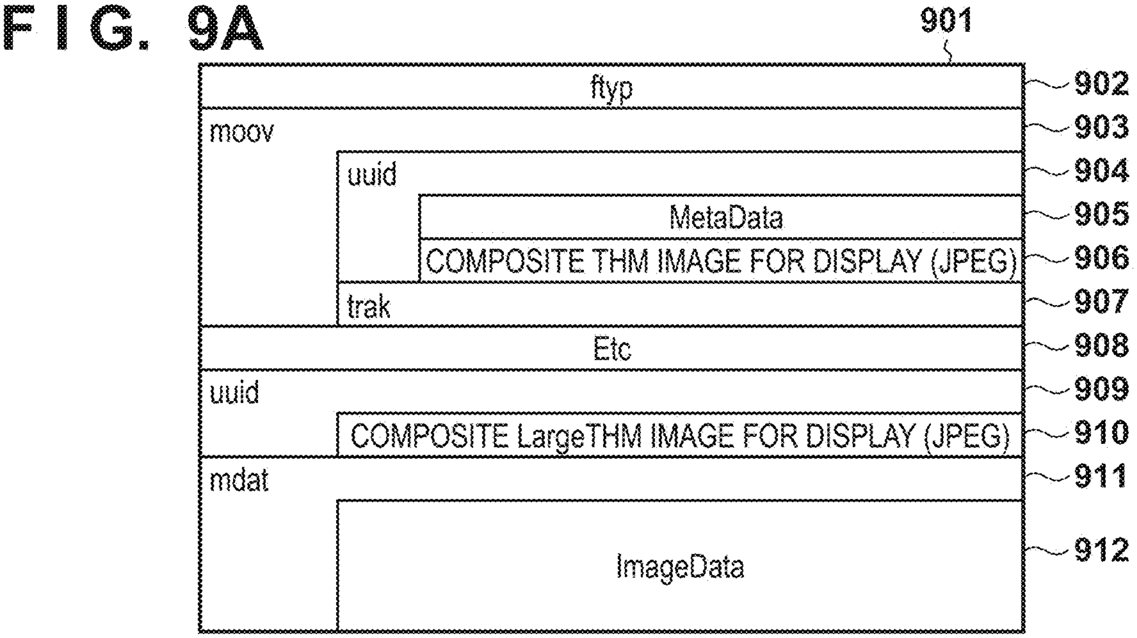
FIG. 9A is a diagram illustrating the structure of a RAW image file 901.

FIG. 9A is a diagram illustrating the structure of a RAW image file 901. The container file format of the RAW image file described in the present embodiment is an ISO-based media file format defined in ISO/IEC 14496-12. As such, the container format of the RAW image file has a tree structure, which has nodes called "boxes". In addition, each box can have a plurality of boxes as sub-elements.

The RAW image file 901 has, at the beginning, a box ftyp 902 for describing the file type. The RAW image file 901 also includes a box moov 903 containing all metadata, a box uuid 909 containing a display image, a box mdat 911 containing the body of the media data (image data) of the track, and other boxes 908.

The box moov 903 has, as sub elements, a box uuid 904 that holds MetaData 905 and a composite THM image 906 for display, and a trak box 907 that holds information referring to ImageData.

The MetaData 905 includes image metadata. The MetaData 905 includes, for example, information indicating the date/time on/at which the image was created, conditions at the time of shooting, whether the image was shot in HDR or SDR, information of the RAW image contained therein (appropriate image, under image, or over image), and other shooting information.

The box uuid 909 has, as a sub element, a composite LargeTHM image 910 for display. The box mdat 911 has, as a sub element, ImageData 912.

Figure 9B:
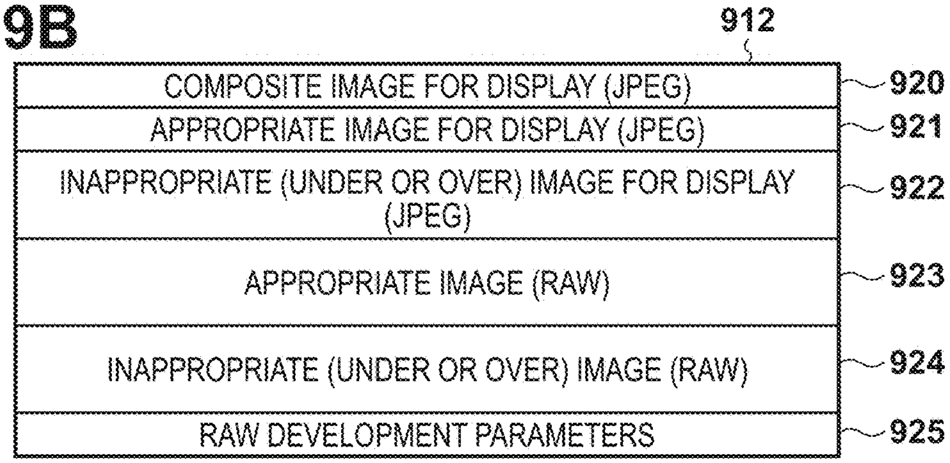
FIG. 9B is a diagram illustrating an example of the configuration of ImageData 912.

FIG. 9B is a diagram illustrating an example of the configuration of ImageData 912 recorded as a still image when the image falls within the SDR dynamic range. In this case, ImageData 912 includes a composite image for display 920, an appropriate image for display 921, an inappropriate image for display 922, an appropriate image 923, an inappropriate image 924, which are compressed using JPEG in the SDR development, and RAW development parameters 925. By recording a plurality of frames in a single file using the ImageData 912 as a single frame, a plurality of frames obtained as a burst can be saved together in a single file. Alternatively, a plurality of frames can be saved as a moving image RAW file.

Figure 9C:
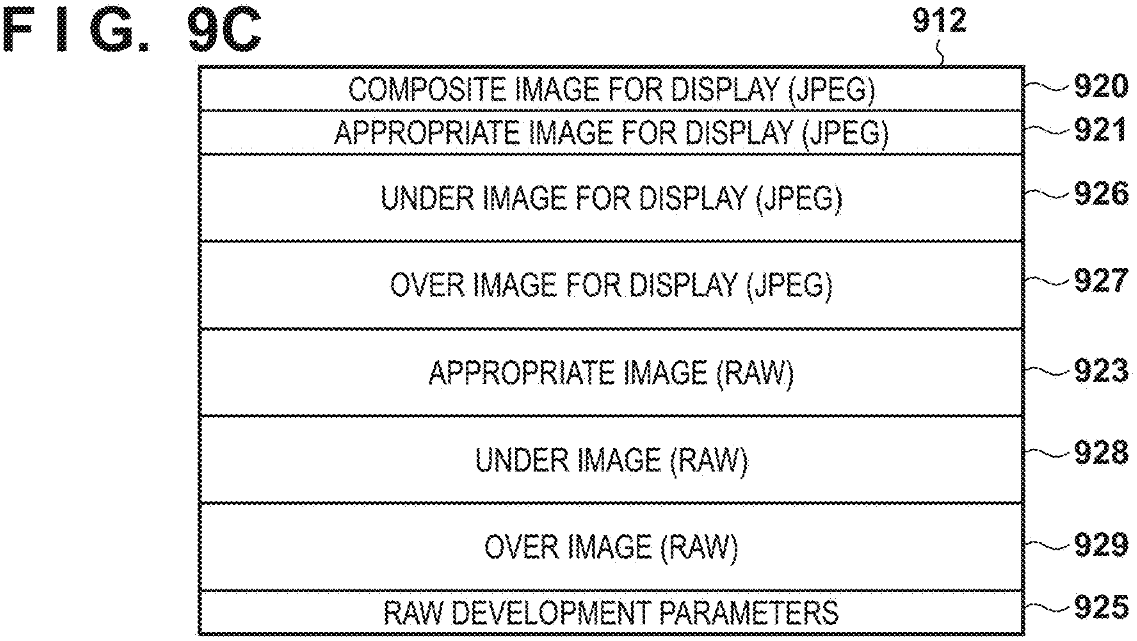
FIG. 9C is a diagram illustrating another example of the configuration of the ImageData 912.

When a plurality of frames are saved in a single file, the under image and the over image may be saved in separate boxes, as illustrated in FIG. 9C.

FIG. 9C is a diagram illustrating another example of the configuration of the ImageData 912 recorded as a still image when the image falls within the SDR dynamic range. In this case, the ImageData 912 includes a composite image for display 920, an appropriate image for display 921, an under image for display 926, and an over image for display 927, which are compressed using JPEG in the SDR development. The ImageData 912 also includes an appropriate image 923 (a first storage region), an under image 928 (a second storage region), an over image 929 (a third storage region), and RAW development parameters 925. By saving a plurality of frames in a single file using the ImageData 912 as a single frame, a plurality of RAW frames obtained as a burst can be saved together in a single file. Alternatively, a plurality of RAW frames can be saved as a moving image RAW file. When recording an image through this method, the appropriate image for display 921 and the appropriate image 923 are recorded for every frame, while a pair including the under image for display 926 and the under image 928, and a pair including the over image for display 927 and the over image 929, are recorded alternately every two frames.

The foregoing has described a case where a RAW image captured in SDR is recorded. When recording a RAW image shot in HDR, the image data may be developed in HDR as the display images (reference signs 906, 910, 920, 921, 922, 926, and 927), and an HEVC-compressed display image may then be recorded.

Note that the file formats described above are merely examples, and a file format having other boxes may be used as necessary.

As described above, according to the fourth embodiment, the image capturing apparatus 100 saves an appropriate image and an inappropriate image generated from a single shot using the image sensor 102 in a single RAW image file. Additionally, the image capturing apparatus 100 may save each image generated from two or more shots using the image sensor 102 in a single RAW image file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-115464, filed Jul. 13, 2023, which is hereby incorporated by reference herein in its entirety.

What is claimed is:

1. A shooting control apparatus comprising:

a shooting control unit configured to control at least two shots to be taken in response to a shooting instruction, using an image sensor configured to generate, in a single shot, a first image and a second image having different exposures; and an exposure control unit configured to perform first exposure control or second exposure control alternately from shot to shot in each of the at least two shots, wherein the first exposure control is exposure control in which the first image is generated at a first exposure and the second image is generated at a second exposure lower than the first exposure, wherein the second exposure control is exposure control in which the first image is generated at the first exposure and the second image is generated at a third exposure higher than the first exposure, and wherein the exposure control unit is implemented using a memory and at least one processor.

2. The shooting control apparatus according to claim 1, further comprising:

a generating unit configured to generate a High Dynamic Range (HDR) composite image by compositing the first image generated in a current shot, the second image generated in the current shot, and the second image generated in a shot one previous, for each shot aside from an earliest shot among the at least two shots, wherein the generating unit is implemented using the memory and the at least one processor.

3. The shooting control apparatus according to claim 2, wherein the generating unit generates an HDR composite image by compositing the first image generated in the earliest shot, the second image generated in the earliest shot, and the second image generated in a second earliest shot.

4. The shooting control apparatus according to claim 1, further comprising:

a generating unit configured to generate an HDR composite image by compositing the first image generated in a shot one previous, the second image generated in the shot one previous, and the second image generated in a current shot, for each shot aside from an earliest shot among the at least two shots, wherein the generating unit is implemented using the memory and the at least one processor.

5. The shooting control apparatus according to claim 1, further comprising:

a generating unit configured to perform first generation processing when the shooting instruction is an instruction to shoot a still image, and perform second generation processing when the shooting instruction is an instruction to shoot a moving image, wherein the first generation processing is processing of: (1) generating an HDR composite image by compositing the first image generated in a current shot, the second image generated in the current shot, and the second image generated in a shot one previous, for each shot aside from an earliest shot among the at least two shots; and (2) generating an HDR composite image by compositing the first image generated in the earliest shot, the second image generated in the earliest shot, and the second image generated in a second earliest shot, wherein the second generation processing is processing of: generating an HDR composite image by compositing the first image generated in a shot one previous, the second image generated in the shot one previous, and the second image generated in a current shot, for each shot aside from the earliest shot among the at least two shots, and wherein the generating unit is implemented using the memory and the at least one processor.

6. The shooting control apparatus according to claim 1, further comprising:

a generating unit configured to generate an HDR composite image in which noise from a pixel corresponding to the first exposure is reduced, by compositing the first image generated in a current shot, the first image generated in a shot one previous, the second image generated in the current shot, and the second image generated in the shot one previous, for each shot aside from an earliest shot among the at least two shots, wherein the generating unit is implemented using the memory and the at least one processor.

7. The shooting control apparatus according to claim 6, wherein the generating unit is configured to:

generate a noise-reduced image by compositing the first image generated in the current shot and the first image generated in the shot one previous; and generate an HDR composite image in which noise of a pixel corresponding to the first exposure is reduced by compositing the noise-reduced image, the second image generated in the current shot, and the second image generated in the shot one previous.

8. The shooting control apparatus according to claim 1, further comprising:

a saving unit configured to save the first image and the second image as a single RAW image file, in each shot among the at least two shots, wherein the saving unit is implemented using the memory and the at least one processor.

9. The shooting control apparatus according to claim 1, further comprising:

a saving unit configured to generate a RAW image file including a first storage region corresponding to the first exposure, a second storage region corresponding to the second exposure, and a third storage region corresponding to the third exposure, save each first image obtained in each of the at least two shots in the first storage region, and save each second image obtained in each of the at least two shots in the second storage region or the third storage region in accordance with an exposure of the corresponding second image, wherein the saving unit is implemented using the memory and the at least one processor.

10. The shooting control apparatus according to claim 1, wherein the exposure control unit is configured to, in each shot in which the second exposure control is performed, excluding an earliest shot among the at least two shots, perform control such that an ISO sensitivity for the second image in a current shot matches an ISO sensitivity for the first image in a shot one previous.

11. The shooting control apparatus according to claim 1, wherein the first exposure is an appropriate exposure, wherein the second exposure is underexposure, and wherein the third exposure is overexposure.

12. The shooting control apparatus according to claim 1, wherein the exposure control unit is configured to perform the first exposure control in an earliest shot among the at least two shots.

13. The shooting control apparatus according to claim 1, wherein the shooting control unit is configured to perform control such that at least three shots are taken as the at least two shots.

14. An image capturing apparatus comprising:

the shooting control apparatus according to claim 1; and the image sensor.

15. A shooting control method executed by a shooting control apparatus, the method comprising:

controlling at least two shots to be taken in response to a shooting instruction, using an image sensor configured to generate, in a single shot, a first image and a second image having different exposures; and performing first exposure control or second exposure control alternately from shot to shot in each of the at least two shots, wherein the first exposure control is exposure control in which the first image is generated at a first exposure and the second image is generated at a second exposure lower than the first exposure, and wherein the second exposure control is exposure control in which the first image is generated at the first exposure and the second image is generated at a third exposure higher than the first exposure.

16. A non-transitory computer-readable storage medium which stores a program for causing a computer to execute a shooting control method comprising:

controlling at least two shots to be taken in response to a shooting instruction, using an image sensor configured to generate, in a single shot, a first image and a second image having different exposures; and performing first exposure control or second exposure control alternately from shot to shot in each of the at least two shots, wherein the first exposure control is exposure control in which the first image is generated at a first exposure and the second image is generated at a second exposure lower than the first exposure, and wherein the second exposure control is exposure control in which the first image is generated at the first exposure and the second image is generated at a third exposure higher than the first exposure.

* * * * *